United States Patent [19]

Tessler

[11] 4,098,997
[45] Jul. 4, 1978

[54] PROCESS FOR PREPARING CROSS-LINKED STARCHES

[75] Inventor: Martin M. Tessler, Edison, N.J.

[73] Assignee: National Starch and Chemical Corporation, Bridgewater, N.J.

[21] Appl. No.: 760,866

[22] Filed: Jan. 21, 1977

[51] Int. Cl.$^2$ .............................................. C08B 31/16
[52] U.S. Cl. .................................. 536/106; 536/105; 536/108; 536/111
[58] Field of Search ................... 536/106, 108, 93, 111

[56] References Cited

U.S. PATENT DOCUMENTS

| | | | |
|---|---|---|---|
| 3,022,288 | 2/1962 | Miller | 536/93 |
| 3,033,852 | 5/1962 | Paschall | 536/50 |
| 3,218,314 | 11/1965 | Miller | 536/93 |

OTHER PUBLICATIONS

Starch: Chemistry and Technology – Part I – by Whistler et al., 1965, pp. 481–483.

*Primary Examiner*—V. P. Hoke
*Attorney, Agent, or Firm*—Edwin Szala; Ellen T. Dec

[57] ABSTRACT

A granular starch base is reacted with a selected propiolate ester in aqueous medium to produce a granular, acetal cross-linked starch, the cross-linkages of which are substantially removable in acidic medium. The cross-linked starch product thus prepared is useful in producing highly-substituted granular starch derivatives from which the cross-linkages may be readily and substantially removed as desired.

10 Claims, No Drawings

PROCESS FOR PREPARING CROSS-LINKED STARCHES

BACKGROUND OF THE INVENTION

This invention relates to a novel process for preparing granular, cross-linked starches. More particularly, this invention relates to a process for preparing granular, acetal cross-linked starches having substantially removable cross-linkages.

It is well known in the art to react starch bases under a variety of reaction conditions with cross-linking agents to obtain cross-linked starches. The granules of a cross-linked starch have been toughened so that they are more resistant to rupturing during cooking than ordinary starch granules. Cross-linked starches may exhibit a markedly reduced tendency to swell or gelatinize and generally display a comparatively short, non-cohesive consistency after cooking. The degree of cross-linking can be controlled and varied over a wide range so as to produce starches in which the tendency of the swollen granules to rupture is decreased through successive stages to starch products in which the swelling of the granules is so highly restrained that they will not swell noticeably when cooked in boiling water. A general discussion of cross-linking of starches and the reagents used therefore may be found in such sources as "Starch: Chemistry and Technology", by R. L. Whistler and E. F. Paschall (ed.), Vol. II (New York and London: Academic Press, 1967). Typical cross-linking agents employed in the preparation of starches for food and industrial use include, for, example, epichlorohydrin, phosphorus oxychloride, water-soluble metaphosphates, cyanuric chloride, aldehydes, and the like.

It has been found that prior cross-linking of a granular starch base allows the starch to be further chemically modified while remaining granular in form under conditions which, in the absence of cross-linking, would produce a non-granular starch derivative. Depending on the ultimate use of the cross-linked starch, it may be desirable to remove the cross-linkages from the final starch product after the intended function has been accomplished. For example, cross-linking may be used to maintain the granules of a starch undergoing a substitution reaction. The product can be prepared in water and washed with water, after which the cross-linkages may be removed with a gelatinized starch product resulting therefrom.

Propiolate esters have not been used in the prior art as cross-linking agents per se. A process for preparing certain starch derivatives (e.g., carboxylatevinyl starch ethers) using propiolate esters is described in U.S. Pat. No. 3,022,288, but concurrent cross-linking of the starches is not reported to occur. Furthermore, the reaction described in the patent is conducted in non-aqueous media with highly alkaline conditions being required, and most of the resultant starch products are non-granular.

Accordingly, it is an object of the present invention to provide a novel process for preparing granular, cross-linked starches.

It is another object to provide a process for preparing granular, acetal cross-linked starches in aqueous neutral or alkaline medium.

It is a further object to provide a novel process for preparing granular, acetal cross-linked starches having cross-linkages which are substantially removable under acidic conditions.

SUMMARY OF THE INVENTION

The above and related objects are achieved in a process for preparing granular, acetal cross-linked starches comprising the steps of:

(a) reacting a granular starch base in aqueous medium with 0.10 – 25%, by dry weight of the starch, of a propiolate ester of the general formula:

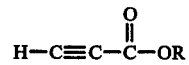

wherein R is selected from the group consisting of alkyl ($C_1 - C_8$), alkenyl ($C_3 - C_8$) and cycloalkyl ($C_3 - C_6$), the reaction being carried out at a pH of 6.5 – 12.5 and at a temperature of 5° – 60° C. for a period of 0.2 – 24 hours; and (b) isolating the resultant cross-linked starch.

The resultant cross-linked starch retains its granular characteristics and possesses cross-linkages which are substantially labile under acidic conditions.

DETAILED DESCRIPTION OF THE PREFERRED EMBODIMENTS

The applicable starch base materials which may be treated in accordance with the present invention may be any granular starch derived from any plant source including corn, potato, sweet potato, wheat, rice, sago, tapioca, waxy maize, sorghum, high-amylose corn, or the like. Also included are the conversion products that are not dispersible under the conditions of the cross-linking reactions herein described and which are derived from any of the above-mentioned starch bases, including, for example, oxidized starches prepared by treatment with oxidants such as sodium hypochlorite, derivatized starches such as starch ethers and esters, and fluidity or thin-boiling starches prepared by enzyme conversion or by mild acid hydrolysis. The use of the term "starch base" is thus seen to include any granular, amylaceous substance, whether untreated or chemically or otherwise modified, which, however, still retains free hydroxyl groups capable of entering into the reaction of the invention.

The propiolate esters suitable herein as cross-linking agents for the starch bases are represented by the formula given above. Examples of suitable propiolate esters include methyl propiolate, ethyl propiolate, isopropyl propiolate, allyl propiolate, cyclohexyl propiolate, 2-octenyl propiolate, and the like.

The amount of propiolate ester to be employed will vary from 0.10 to 25%, based on the dry weight of the starch, with the preferred amount being 0.5 – 10%, depending upon such factors as the starch base employed, the degree of cross-linking required in the end-product, and the particular propiolate ester employed.

The reaction between the starch base and propiolate ester is carried out in aqueous medium. The pH of the reaction mixture may vary from 6.5 to 12.5, and preferably from 8.5 to 12.0. The pH may be adjusted by adding a dilute (e.g., 3%) aqueous solution of a base such as, for example, sodium hydroxide, potassium hydroxide, lithium hydroxide, ammonium hydroxide, tetraalkyl ammonium hydroxide, and the like to the starch slurry in water. Alternatively, the starch base is added to an aqueous solution of the base in a concentration such that excess alkali is present and no further adjustment in pH is necessary for the duration of the reaction.

If the reaction is conducted at a high pH (i.e., greater than about 11), sodium sulfate is typically added to suppress swelling of the starch granules and to give a product which is more easily filterable. The amount of sodium sulfate employed may range from 15 to 50% by the weight of dry starch, and preferably 20 – 40%.

The cross-linking reaction is carried out at a temperature of 5° – 60° C., preferably 20° – 40° C. It will be recognized that use of temperatures above about 60° C. would be undesirable for this purpose since it may result in granule swelling and filtration difficulties or gelatinization of the starch.

Reaction time will vary from about 0.2 to 24 hours, preferably 0.5 – 1.5 hours, depending upon such factors as the reactivity of the particular propiolate ester used, the amount of propiolate ester employed, the temperature of the reaction, etc. Completion of the reaction may be determined by performing a sediment volume test. In this procedure, an aqueous suspension at pH 7.0 of the cross-linked starch product having a concentration of 1% solids, by weight, is cooked in a boiling water bath for 15 minutes. The resulting dispersion is then allowed to stand in a graduated vessel, such as a 100-ml. graduated cylinder, at room temperature for a period of about 24 hours. The cooked product will separate into layers on the basis of relative inhibition. In extreme cases the cooked product will completely settle out, with the sediment so formed occupying different volumes depending on the degree of inhibition of the reaction product. These sediments are composed of insoluble granules of the starch derivative whose swollen volumes are relative to the degree of cross-linking of the derivatives. Thus, because of their lower swelling and hydration capacity, the more highly cross-linked products will yield smaller sediment volumes than corresponding products having less cross-linking. Where, however, the original starch base exhibits no sediment formation because of the completely swollen, highly hydrated and/or disrupted nature of its granules, e.g., in the case of waxy maize starch, cross-linking in the product will be evidenced by the subsequent formation of sediment. The result is attributable to the toughened state of the cross-linked granules. The sediment volume will decrease with increasing amounts of cross-linking but will become constant when the reaction is complete.

At the end of the reaction, the pH of the reaction mixture is ordinarily lowered to about 5.0 – 7.0 and the product isolated by filtration, washed with water, and dried. The pH is typically lowered using dilute aqueous acid such as sulfuric or hydrochloric acid, but other commonly-used acids are acceptable. At a pH of about 3, hydrolysis of the acetal cross-linkage will occur, resulting in a substantially non-cross-linked starch product. (The rate of hydrolysis will depend on the temperature as well as the pH. Thus, the rate of hydrolysis will increase as the temperature is increased and/or the pH is decreased.)

The granular, acetal cross-linked starches prepared by the process of this invention are particularly useful in producing granular, highly-substituted starch derivatives from which the cross-linkages may be readily removed. The method for producing such derivatives comprises reacting the acetal cross-linked starch of this invention with a monofunctional esterifying or etherifying reagent such as, for example, ethylene oxide, propylene oxide, acrylonitrile, acetic anhydride, etc. in aqueous alkaline media (according to the procedure of copending U.S. patent application Ser. No. 704,472 filed July 12, 1976). The highly-substituted starch derivative thus prepared is then treated under acidic conditions to remove the cross-linkage, thereby producing a substantially non-cross-linked, high D.S. dispersed starch derivative. The highly-substituted granular starch derivatives having labile cross-linkages are useful in a variety of applications such as in textiles, adhesives and paper. An acetal cross-linked, cationic-substituted starch is particularly useful in operations such as paper-making, wherein the cross-linkages can be removed and the starch readily dispersed during a relatively low-pH starch cooking process. Using the propiolate ester as cross-linking agent in this invention is particularly advantageous because the cross-linked starch resulting therefrom does not require washing prior to the alkaline substitution reaction. Washing is required if aldehydes, e.g., acetaldehyde, are used to prepare acetal cross-linked starches in water. Furthermore, both the cross-linking reaction and the subsequent substitution reaction are carried out at high pH, eliminating the need for making any large pH adjustments. These advantages result in a more practical and efficient manufacturing process.

The term "acetal cross-linked starches" as used herein is meant to describe starches of the general structures:

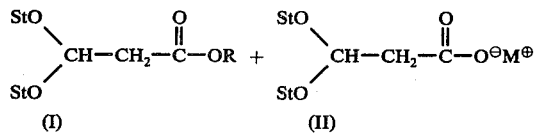

wherein St represents the particular starch group, R is as defined above, and M is a cation, for example, hydrogen, sodium, potassium, lithium, ammonium, quaternary amine, and the like. The relative amounts of I and II will depend on the reaction temperature, pH, time and structure of R. Thus the esters of I are not relatively stable at high pH and will hydrolyze to form II. It is to be understood that if the reaction of the starch base with propiolate ester does not go to completion, the resultant acetal cross-linked starch product of this invention may contain some carboxylatevinyl ether substituents. These carboxylatevinyl ether substituents do not contribute to the cross-linking of the starch and hence are of no importance to the present invention.

The following examples will illustrate the practice of this invention. In these examples, all parts and percentages are given by weight and all temperatures in degrees Celsius unless otherwise noted.

EXAMPLE I

This example illustrates the preparation of the cross-linked starches of this invention using ethyl propiolate as the cross-linking agent. The general procedure in preparing Starch Samples A – W in Table I is as follows:

A total of 100 parts of the indicated starch base was suspended in 125 to 150 parts water and the pH raised to the indicated value with 3% aqueous sodium hydroxide solution. Ethyl propiolate was then added in the amount indicated and the pH controlled by adding 3% aqueous sodium hydroxide as required. The reaction was carried out at the indicated temperature for the indicated time, after which the pH was lowered to 5.0 – 6.0 with dilute sulfuric acid or hydrochloric acid. Finally, the resultant cross-linked starch product was isolated by filtration, washed three times with water and dried.

The cross-linked starch products were characterized by the following sediment volume test:

A total of 1.00 grams starch, dry basis, was placed in a beaker and 95.0 ml. distilled water added. The pH was adjusted to 7.0 with 0.1 N aqueous sodium hydroxide. If necessary, 0.1 N hydrochloric acid was used to lower the pH during pH adjustment. The starch slurry was cooked in a boiling water bath for 15 minutes and distilled water was then added to bring the total weight to 100.0 g. The mixture was stirred thoroughly and transferred to a 100-ml. graduated cylinder. The cylinder was sealed with aluminum foil and the starch slurry was kept at room temperature for 24 hours. The sediment, for 16 hours. After completion of the reaction, the pH was lowered to 5.2 with 9.5% aqueous hydrochloric acid and the resultant cross-linked starch product isolated by filtration, washed with water, and dried. Upon analysis by the sediment volume test described in Example I, the product had a sediment volume of 14 ml., indicating that significant inhibition had taken place. (An untreated waxy maize control showed no sediment.)

EXAMPLES III – VI

These examples illustrate the preparation of the cross-linked starches of this invention using various propiolate esters as cross-linking agents.

A total of 40 parts waxy maize was suspended in 60 parts water and the pH raised to 11.0 with 3% aqueous sodium hydroxide solution. The

TABLE I

| Starch Sample | Starch Base | Amount of Ethyl Propiolate (% by weight of Starch) | pH | Reaction Conditions Temperature (° C.) | Time (hours) | Sediment Volume (ml.) Reaction Product | Starch Base (control) |
|---|---|---|---|---|---|---|---|
| A | Waxy maize | 1.0 | 12.0 | ambient | 2.0 | 20 | 0 |
| B | " | 1.0 | 11.0 | " | 21.0 | 17 | 0 |
| C | " | 1.2 | 10.5 | " | 19.0 | 16 | 0 |
| D | " | 1.0 | 10.0 | " | 18.0 | 17 | 0 |
| E | " | 3.2 | 9.5 | " | 17.0 | 9 | 0 |
| F | " | 1.3 | 9.0 | " | 17.0 | 17 | 0 |
| G | " | 1.2 | 8.0 | " | 20.0 | 38 | 0 |
| H | " | 1.0 | 7.0 | " | 2.0 | 60 | 0 |
| I | " | 1.0 | 6.0 | " | 2.0 | 98* | 0 |
| J | " | 1.1 | 9.5 | 40 | 17.0 | 17 | 0 |
| K | " | 1.3 | 10.0 | 40 | 17.0 | 16 | 0 |
| L | " | 0.7 | 10.5 | 40 | 17.0 | 15 | 0 |
| M | " | 1.0 | 10.0 | 55 | 2.0 | 17 | 0 |
| N | " | 1.0 | 10.0 | 10 | 2.0 | 16 | 0 |
| O | " | 1.0 | 10.0 | ambient | 1.0 | 17 | 0 |
| P | " | 1.0 | 10.0 | " | 2.0 | 16 | 0 |
| Q | " | 1.0 | 10.0 | " | 4.0 | 15 | 0 |
| R | " | 1.0 | 10.0 | " | 7.0 | 17 | 0 |
| S | " | 0.3 | 10.0 | " | 2.0 | 24 | 0 |
| T | " | 16.9 | 10.0 | " | 2.0 | 7 | 0 |
| U | Tapioca | 1.0 | 9.0 | " | 2.0 | 12 | 91** |
| V | Oxidized Corn Starch (40 fluidity) | 2.1 | 9.0 | " | 2.0 | 10 | 0 |
| W | Waxy maize previously treated with 7.0% propylene oxide and 0.02% phosphorus oxychloride | 1.5 | 9.0 | " | 2.0 | 20 | 26*** |

*This value for the sediment volume indicates that the reaction product has an insignificant amount of cross-linking. The reaction was conducted at a pH outside of the specified pH range.
**This value does not represent a true sediment volume; two phases were observed in the graduated cylinder, one phase being hazy (91 ml.) and the other phase clear.
***This value indicates that the control (i.e., treated waxy maize) is itself slightly cross-linked.

which is swollen starch granules, was then measured. The results are summarized in Table I. The control used for comparison of results for a given reaction product was the particular starch base used to prepare that product.

EXAMPLE II

This example illustrates the preparation of the cross-linked starches of this invention using excess alkali.

A total of 0.9 parts sodium hydroxide and 9.0 parts sodium sulfate were dissolved in 45 parts water. A total of 30 parts waxy maize and 0.32 parts ethyl propiolate were then added and the resulting mixture, which had a pH of 12.0, agitated at room temperature in a sealed jar propiolate ester as shown in Table II was then added in the amount indicated and the resulting mixture agitated for 16 hours at room temperature while controlling th pH at 11.0 by adding 3% aqueous sodium hydroxide as required. At the end of the reaction, the pH was lowered to 6.5 with 10% aqueous hydrochloric acid and the resultant starch product isolated by filtration, washed with water, and dried. The amount of cross-linking in the products was determined by the sediment volume test described in Example I. The results, given in Table II, indicate that the starch reaction products are highly cross-linked.

TABLE II

| Example | Propiolate Ester | Amount of Propiolate Ester (% by weight of Starch) | Sediment Volume (ml.) Reaction Product | Starch Base (Control) |
|---|---|---|---|---|
| III | n-hexyl propiolate | 10.0 | 9 | 0 |
| IV | n-octyl propiolate | 10.0 | 14 | 0 |
| V | allyl propiolate | 10.0 | 10 | 0 |
| VI | cyclohexyl propiolate | 10.0 | 9 | 0 |

EXAMPLE VII

This example illustrates the use of a cross-linked starch of this invention in preparing highly-substituted starch derivatives.

A total of 100 parts of Starch Sample E from Example I was added to a solution of 1.5 parts sodium hydroxide and 30 parts sodium sulfate in 125 parts water. A total of 30 parts propylene oxide was then added and the resulting mixture agitated in a sealed jar at 40° C. for 16 hours. When the reaction was complete, 150 parts water was added to reduce the viscosity, and the pH was then lowered to 6.0 with 9.5% aqueous hydrochloric acid. The resultant stabilized starch derivative was isolated by filtration, washed three times by resuspending in water and filtering, and dried. Upon analysis the starch derivative was found to contain 18.6% propylene oxide by weight.

The stability of the cross-linkage in the starch product was determined in the following manner. A total of 6.0 parts starch product was added to 72.0 parts water and the resulting suspension cooked at pH 7.0 for 20 minutes in a boiling water bath. The cooked starch was cooled and allowed to stand at room temperature for 24 hours. The starch settled slightly and when stirred was relatively thin. The product was also cooked in the identical manner as described above except the pH was lowered to 3.0. The cooled dispersion of the pH 3.0 cook was much clearer and heavier than the pH 7.0 cook and no settling occurred, the results indicating that the cross-linkage is substantially removed at pH 3.0 but remains intact at pH 7.0.

Summarizing, this invention is seen to provide a process for preparing granular, acetal cross-linked starches by reaction under controlled conditions of a granular starch base with a selected propiolate ester in an aqueous medium.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

I claim:

1. A process for preparing granular, acetal cross-linked starches comprising of the steps of:
   (a) reacting a granular starch base in an aqueous medium with 0.10 – 25%, by dry weight of the starch, of a propiolate ester of the general formula:

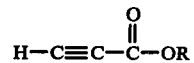

wherein R is selected from the group consisting of alkyl ($C_1 - C_8$), alkenyl ($C_3 - C_8$) and cycloalkyl ($C_3 - C_6$), the reaction being carried out at a pH of 6.5 – 12.5 and at a temperature of 5° – 60° C. for a period of 0.2 – 24 hours; and
   (b) isolating the resultant granular cross-linked starch.

2. The process of claim 1 wherein said reaction is carried out at a pH of 8.5 – 12.0 and at a temperature of 20° – 40° C. for a period of 0.5 – 1.5 hours.

3. the process of claim 1 wherein said reaction is carried out in the presence of 15 – 50%, by dry weight of the starch, of sodium sulfate.

4. The process of claim 3 wherein said reaction is carried out in the presence of 20 – 40%, by dry weight of the starch, of said sodium sulfate.

5. The process of claim 1 wherein 0.5 – 10%, dry weight of the starch, of said propiolate ester is reacted.

6. The process of claim 1 wherein said granular starch base is waxy maize or corn starch.

7. The process of claim 1 wherein said propiolate ester is selected from the group consisting of methyl propiolate, ethyl propiolate, isopropyl propiolate, allyl propiolate, n-hexyl propiolate, n-octyl propiolate, 2-octenyl propiolate and cyclohexyl propiolate.

8. The process of claim 1 wherein said propiolate ester is ethyl propiolate.

9. The process of claim 1 wherein after said reaction of step (a), the pH is lowered to 5.0 – 7.0 and said cross-linked starch is isolated by filtration, washed and dried.

10. As a composition of matter, the granular, acetal cross-linked starch formed by the process of claim 1.

* * * * *